(12) United States Patent
Chen et al.

(10) Patent No.: US 11,913,580 B2
(45) Date of Patent: Feb. 27, 2024

(54) QUICK CONNECTOR STRUCTURE

(71) Applicants: SHOWER KAOKANG ENTERPRISE CO., LTD., Changhua (TW); Shen-En Chiang, Taichung (TW)

(72) Inventors: Chao-Chi Chen, Changhua (TW); Shen-En Chiang, Taichung (TW)

( * ) Notice: Subject to any disclaimer, the term of this patent is extended or adjusted under 35 U.S.C. 154(b) by 0 days.

(21) Appl. No.: 18/118,346

(22) Filed: Mar. 7, 2023

(65) Prior Publication Data

US 2023/0204141 A1 Jun. 29, 2023

Related U.S. Application Data

(63) Continuation of application No. 15/912,245, filed on Mar. 5, 2018, now Pat. No. 11,598,465.

(30) Foreign Application Priority Data

Jan. 25, 2018 (TW) .................. 107102773

(51) Int. Cl.
  *F16L 37/14* (2006.01)
  *F16L 41/02* (2006.01)
  *F16K 11/22* (2006.01)

(52) U.S. Cl.
  CPC .......... *F16L 37/144* (2013.01); *F16L 41/021* (2013.01); *F16K 11/22* (2013.01); *F16L 2201/10* (2013.01)

(58) Field of Classification Search
  CPC . F16L 37/144; F16L 37/0841; F16L 37/0885; F16L 37/0842; F16L 37/1225; F16L 37/088; F16L 37/12; F16L 2201/10
  See application file for complete search history.

(56) References Cited

U.S. PATENT DOCUMENTS 9,188,267 B2 * 11/2015 Fansler ................. F16L 37/144

\* cited by examiner

*Primary Examiner* — Aaron M Dunwoody
(74) *Attorney, Agent, or Firm* — The Law Office of Austin Bonderer, PC; Austin Bonderer (57) ABSTRACT

A quick connect structure having a fitting connector, a connector, and U-shaped positioning snap pin. The fitting connector has a connector part, a fitting connector body part coupled to the connector part, and a fitting part coupled to the fitting connector. The connector part, the fitting connector body part, and the fitting part define a fitting hole extending therethrough, and the fitting part defines positioning groove, a longitudinal snap hole, and a side snap opening in communication with the longitudinal snap hole. The connector has a connection end, a connector body part coupled to the connection end, and a positioning bump. The connection end and the connector body part define a duct hole extending therethrough, the connection end defines a positioning snap groove, and the fitting connector is configured to accept the connection end in the fitting hole. When the connection end is fully inserted into the fitting connector, the positioning bump is located in the positioning groove, and the longitudinal snap hole is aligned with the positioning snap groove. The U-shaped positioning snap pin has a pin base, a pin body part coupled to the pin base, and a snap protrusion coupled to the pin body part. The U-shaped positioning snap pin is configured to be partially inserted and fully inserted into the longitudinal snap hole; when partially interested, the snap protrusion engages the side snap opening and the connector is able to be inserted into the fitting connector; and when fully inserted and when the connector is inserted into the fitting connector, the pin body part engages the positioning snap groove and the snap protrusion engages a longitudinal snap hole exit.

17 Claims, 7 Drawing Sheets

PRIOR ART

QUICK CONNECTOR STRUCTURE

FIELD OF THE INVENTION

The invention relates to a quick connector structure and, in particular, to a quick connector structure used in pipe connections.

BACKGROUND OF THE INVENTION

Figure 6:
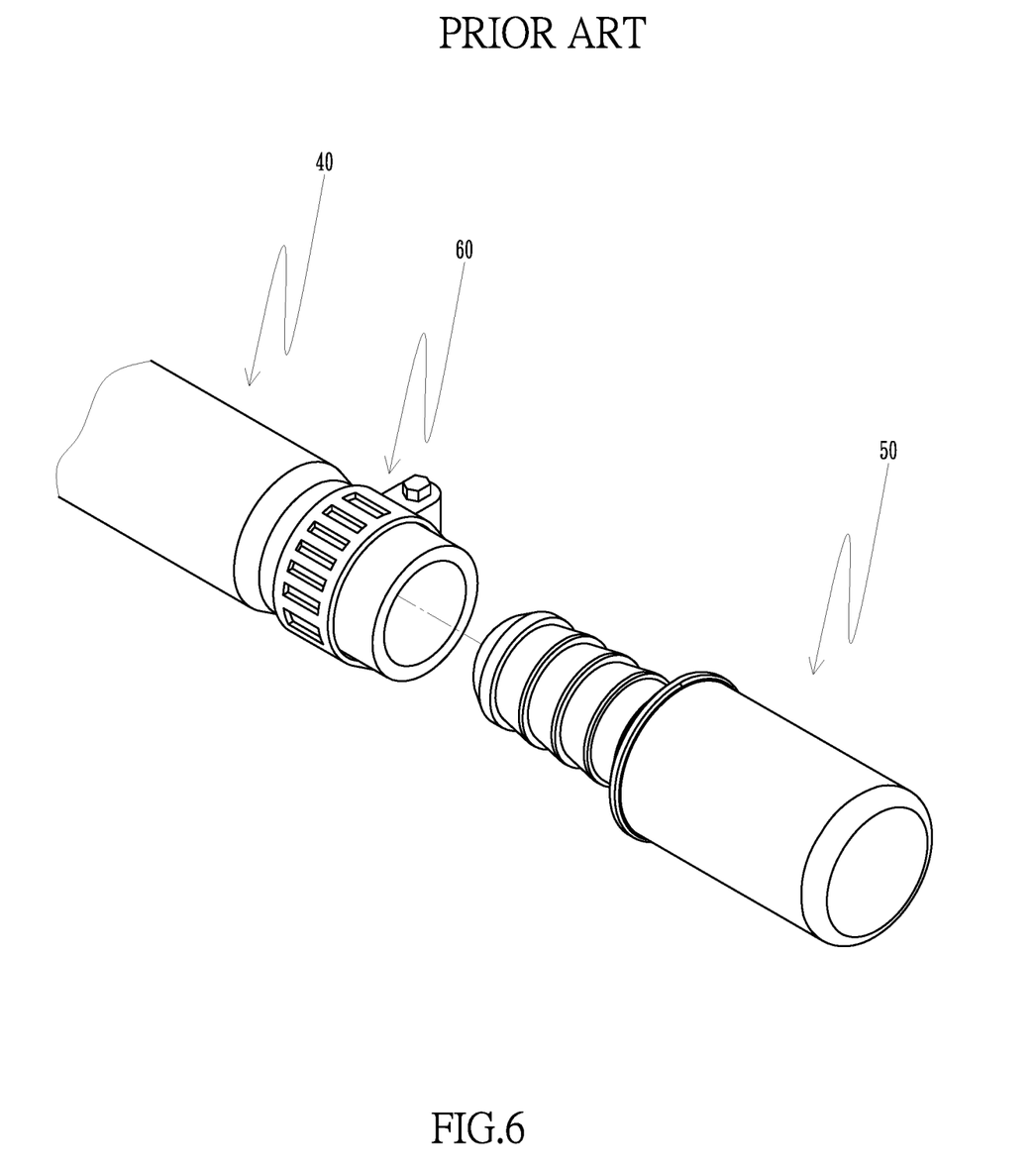
FIG. 6 shows one use of a conventional pipe connector.
Figure 7:
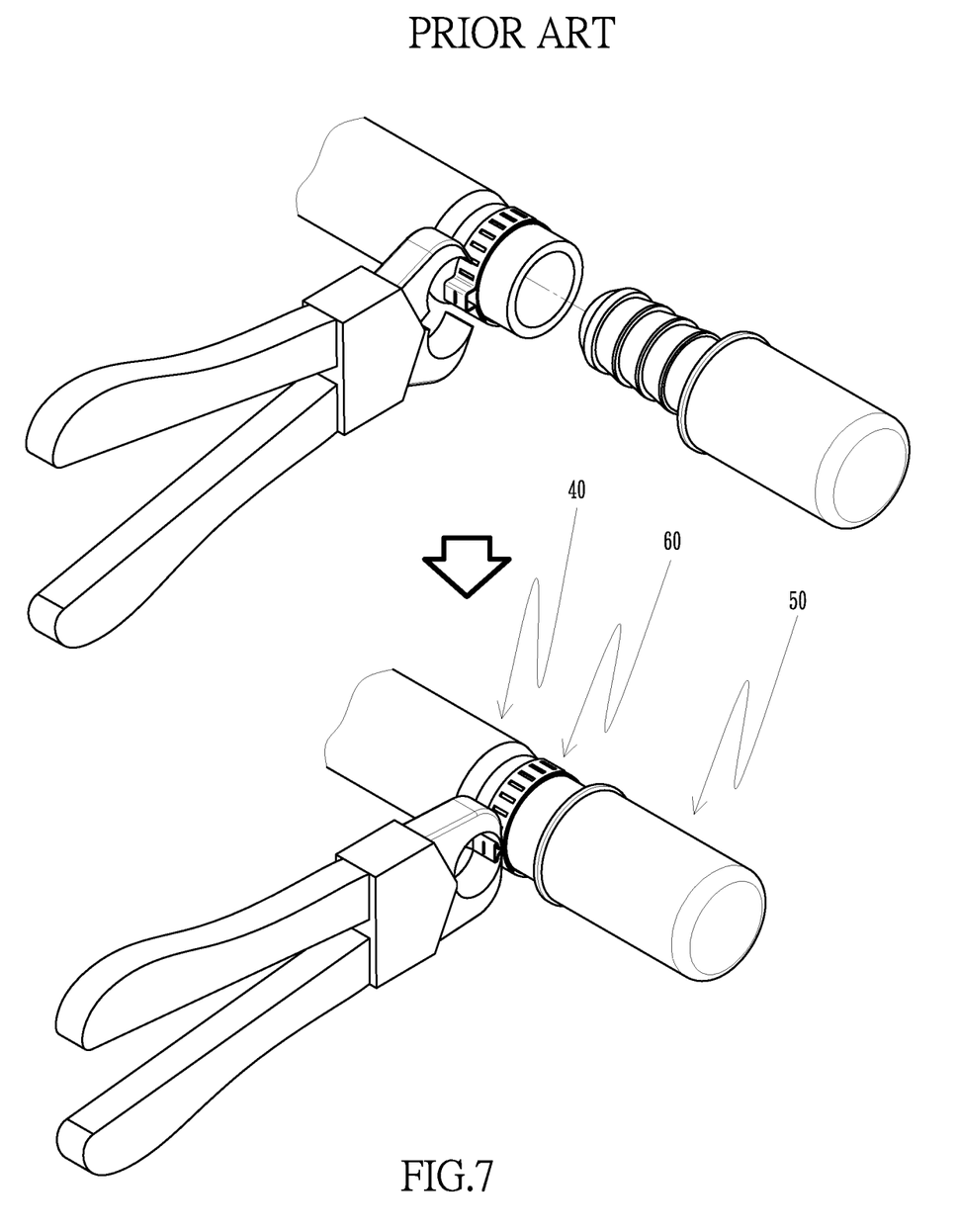
FIG. 7 shows another use of a conventional pipe connector.

FIGS. 6 and 7 show two usage states of a conventional pipe connector. A pipe body 40 is directly fitted to a pipe connector 50. In order to prevent the pipe body 40 from being detached from the pipe connector 50, one often uses an adjustable pipe clamp device 60 to tighten or hold the connection. Each fitting part in the pipeline requires one such pipe clamp device 60. This is inconvenient for pipe connections. Moreover, the pipe connections are often in a smaller or concealed space. After the pipe body 40 and the pipe connector 50 are fitted, it becomes extremely difficult to adjust the pipe clamp device 60. Due to the limited space, the use of tools is quite inconvenient. Hence, improvements are required.

SUMMARY OF THE INVENTION

In view of the foregoing problems in convenience and stability of pipe connections, it is an objective of the invention to provide a quick connector structure.

A primary objective of the invention is to provide a quick connector structure, which includes a fitting connector, a connector, and a U-shaped positioning snap pin. The fitting connector is a pipe connector, a three-way valve connector, or a washing machine valve connector. The fitting connector is provided with a connector part, a connector body part, and a fitting part. A fitting hole is formed in the fitting part through the connector part and the connector body part. The fitting hole has a hole inner wall. Both sides of the fitting part are respectively formed with a longitudinal snap hole, with a resisting block is disposed in between. Both sides of the longitudinal snap holes are formed with one snap opening and at least one side snap opening on the hole inner wall. The upper and lower sides of the opening of the longitudinal snap holes are respectively formed with a positioning groove. The connector is provided with a connector body part and a connection end, with a duct hole formed through them. Near the connection end, the left and right sides of the connector body part are respectively formed with a positioning snap groove. Near the connection end, the upper and lower side of the connector body part are respectively formed with a positioning bump. The fitting hole formed in the fitting part of the fitting connector fits to the connection end. The snap openings on both sides of the hole inner wall of the fitting hole are opposite to the positioning snap grooves provided on both sides of the connection end. The two positioning grooves of the longitudinal snap holes provided in the fitting hole of the fitting part are positioned by the two positioning bumps formed on the connector body part. The U-shaped positioning snap pin has a pin base, both sides of which are extended downward by two pin body parts in an elastic way. The outer sides of the two pin body parts are respectively protruded with a snap protrusion. Between the two pin body parts is provided with a positioning inner recess. The two pin body parts achieve positioning along a positioning line, respectively. The two pin body parts follow the positioning lines to snap the longitudinal snap holes provided on both sides of the fitting part, simultaneously snapping the snap grooves formed on both sides of the connection end. The snap protrusions formed on the outer sides of the two pin body parts engage against the side snap openings on the hole inner wall on both sides of the longitudinal snap holes. The positioning inner recess formed between the two pin body parts snap the resisting block formed on the fitting part. The combination between the connector part of the fitting connector and a pipe, the U-shaped positioning snap pin can stabilize the connection between the fitting connector and the connector. This enables a quick positioning assembly and reduces the difficulty in assembly in a smaller or concealed space, achieving the effects of stability and convenience in assembly.

DESCRIPTION OF THE PREFERRED EMBODIMENTS

The aforementioned and other objectives and advantages of this disclosure will become clearer in light of the following detailed description of an illustrative embodiment of this invention described in connection with the drawings.

Figure 1:
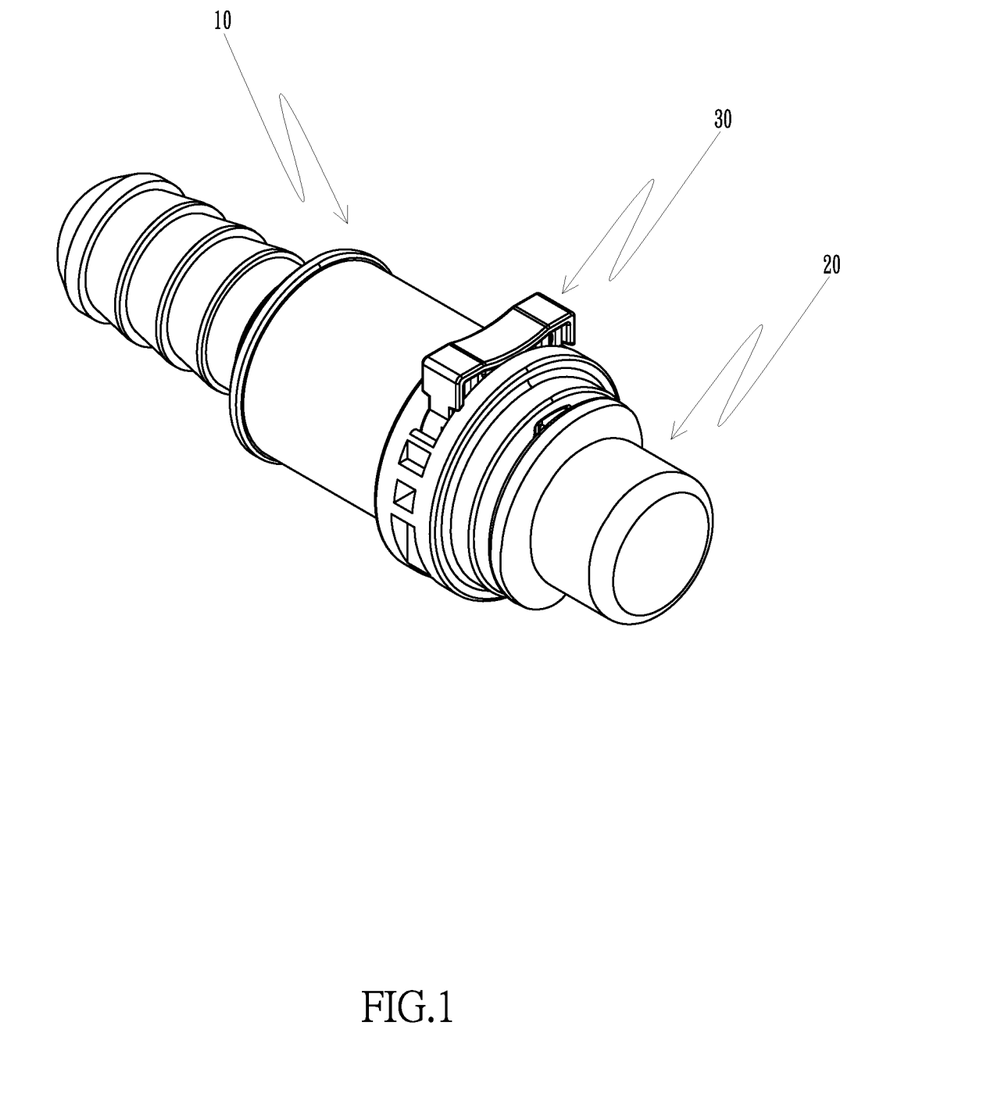
FIG. 1 is a three-dimensional assembly view of the disclosed quick connector structure.
Figure 2:
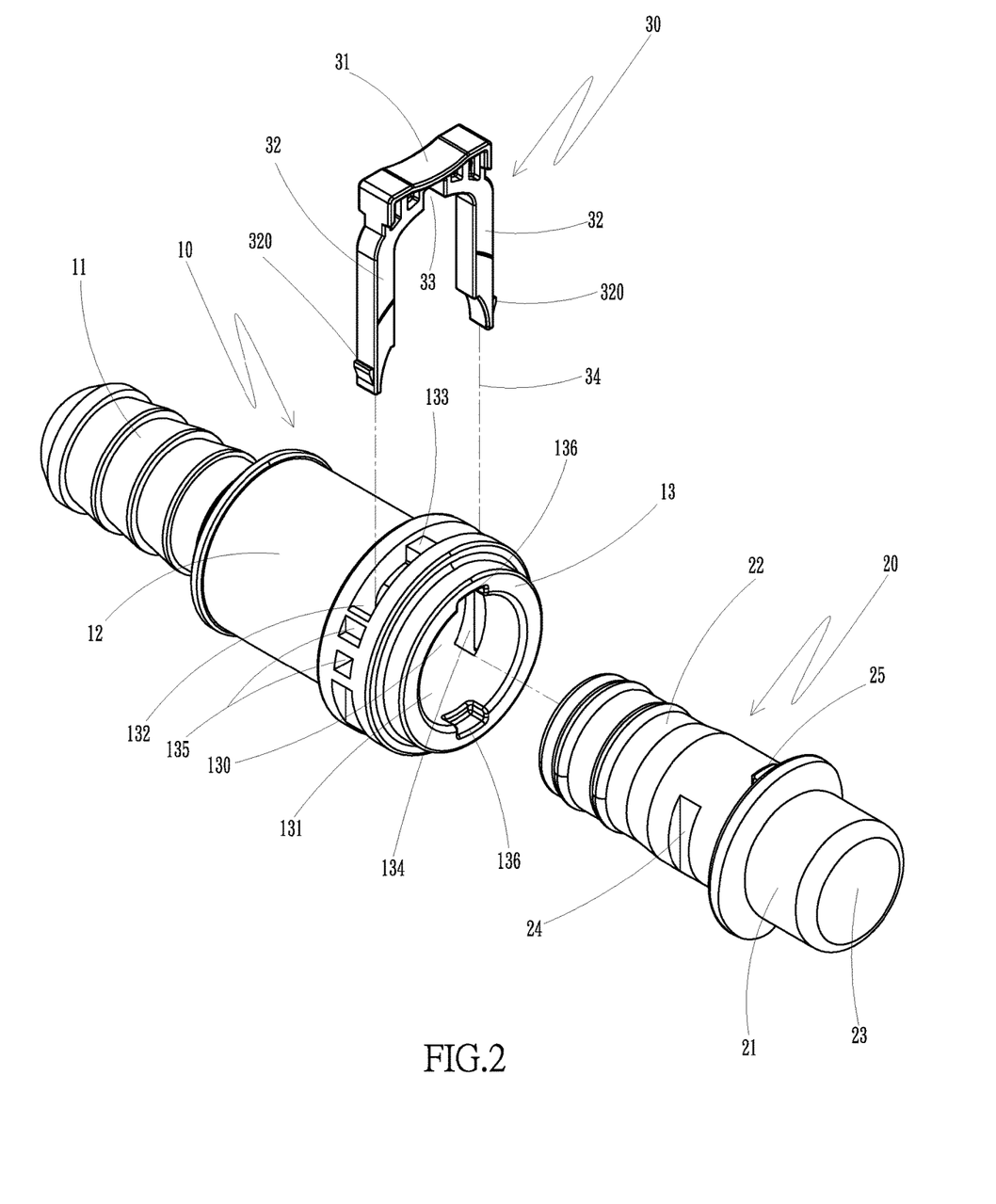
FIG. 2 is a three-dimensional exploded view of the disclosed quick connector structure.
Figure 3:
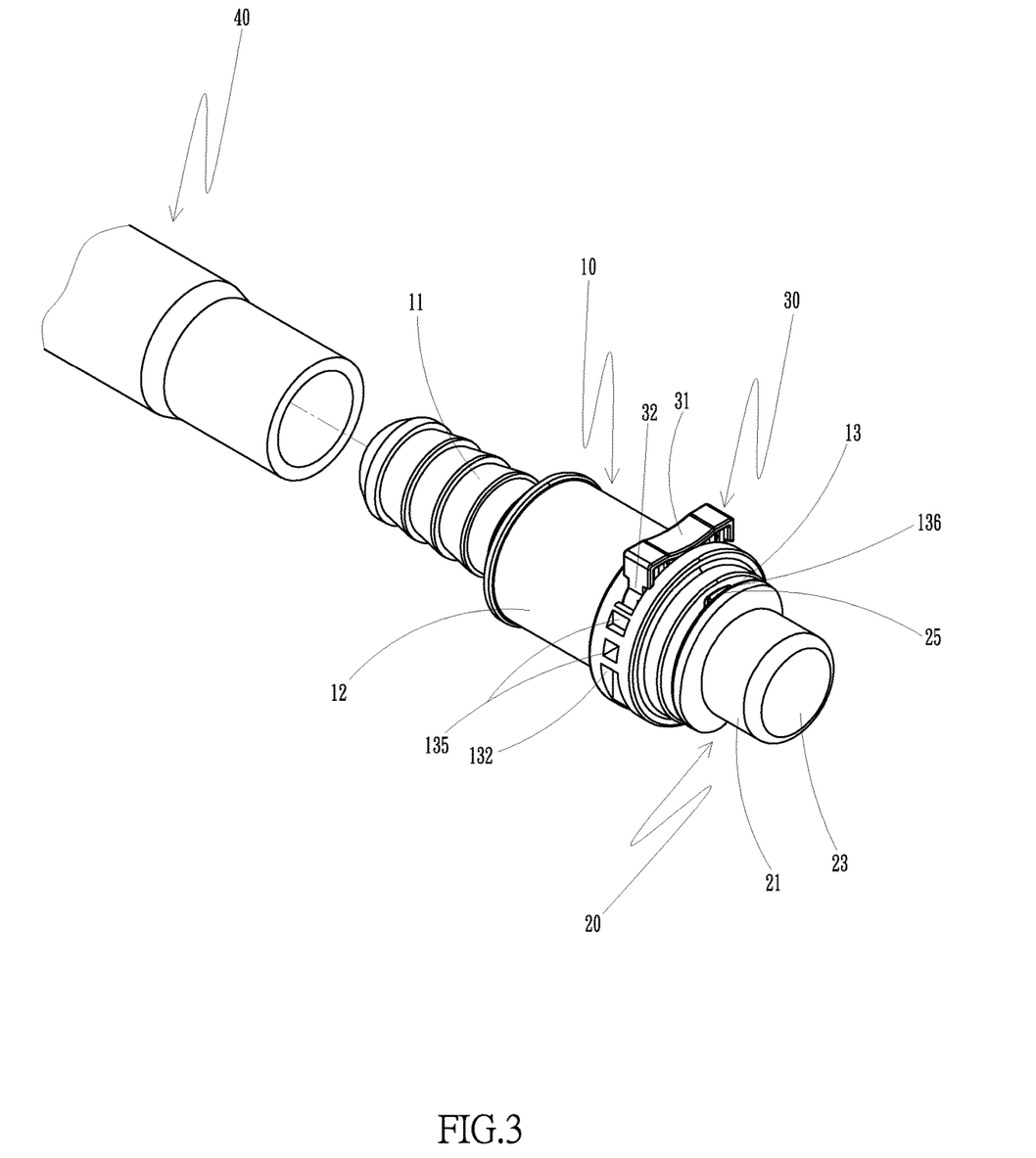
FIG. 3 shows the disclosed quick connector structure being used to connect two pipes.
Figure 4:
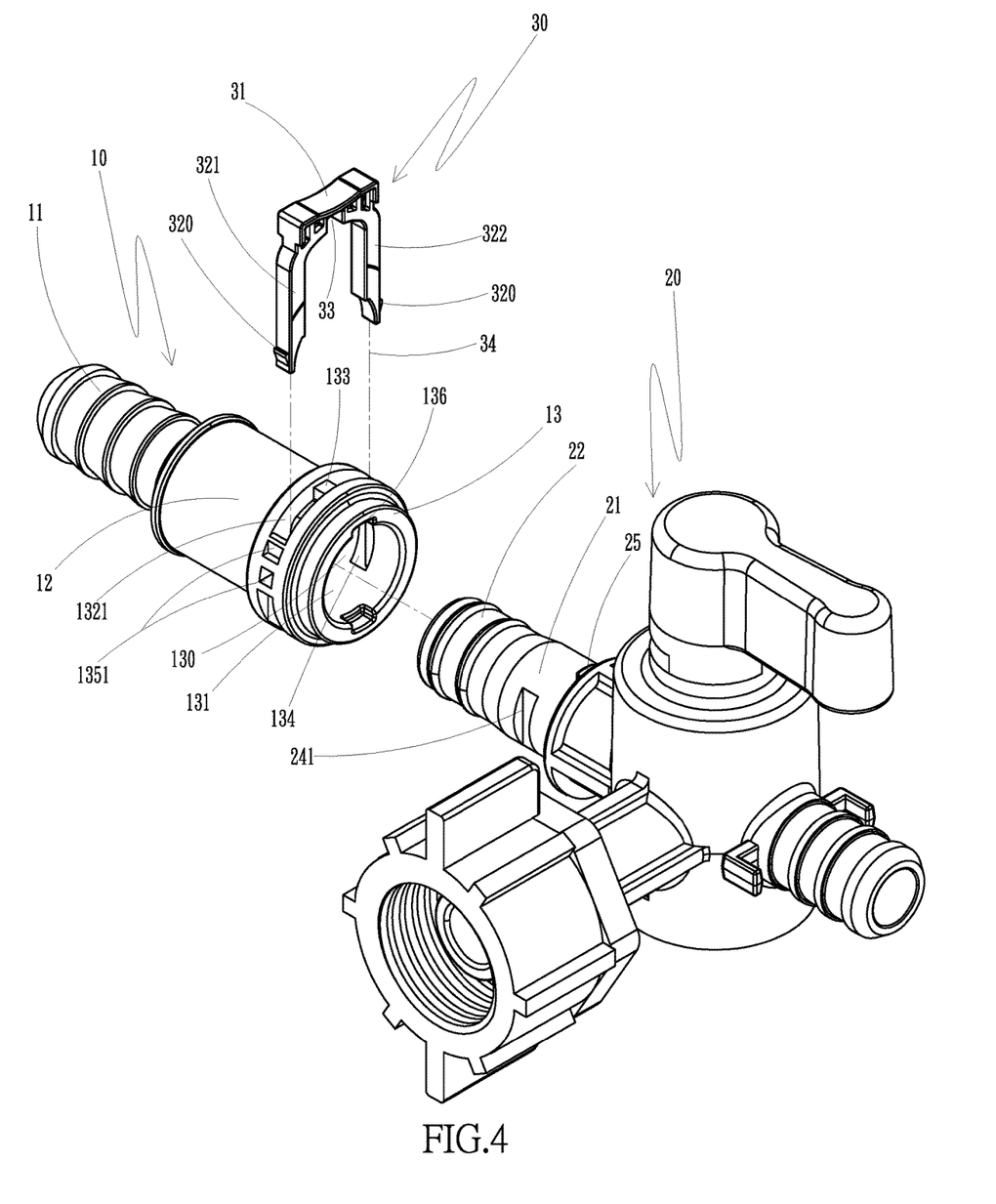
FIG. 4 shows a first embodiment of the disclosed quick connector structure used at a three-way valve connector.
Figure 5:
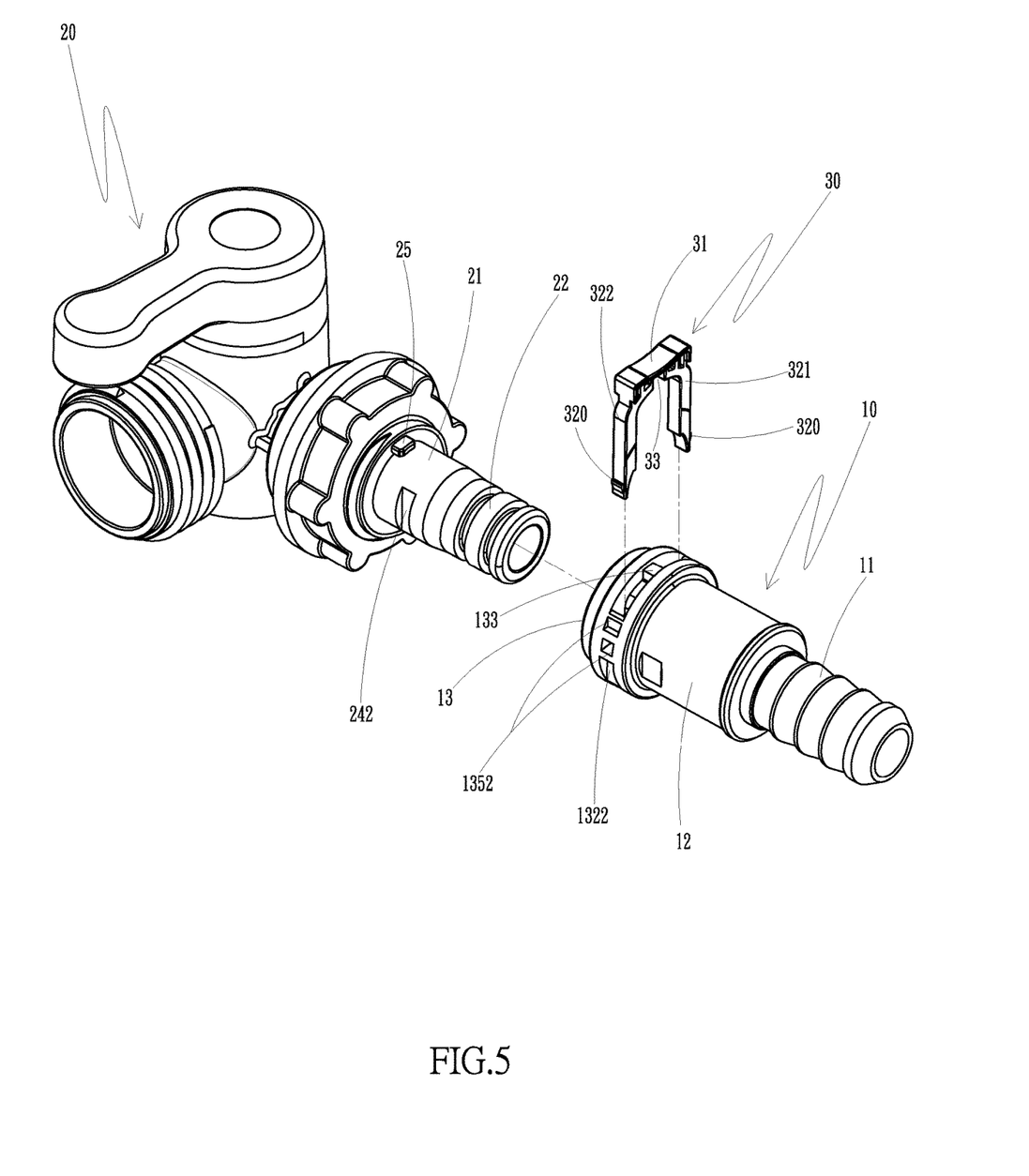
FIG. 5 shows a second embodiment of the disclosed quick connector structure used at a washing machine valve connector.

Please refer to FIGS. 1 and 2, which are three-dimensional assembly view and three-dimensional exploded view of the disclosed quick connector structure, respectively.

The disclosed quick connector structure includes a fitting connector 10, a connector 20, and a U-shaped positioning snap pin 30. The fitting connector 10 is a pipe connector, a three-way valve connector, or a washing machine valve connector.

The fitting connector 10 is provided with a connector part 11, a fitting connector body part 12, and a fitting part 13. A fitting hole 130 is formed in the fitting part 13 through the connector part 11 and the fitting connector body part 12. The fitting hole 130 has a hole inner wall 131. Both sides of the fitting part 13 are respectively formed with a longitudinal snap hole 132, with a resisting block 133 is disposed in between. Both sides of the longitudinal snap holes 132 (also identified as a first longitudinal snap hole 1321 and a second longitudinal snap hole 1322) are formed with one snap opening 134 and at least one side snap opening 135 on the hole inner wall 131 (also identified as a first side snap openings 1351 and a second side snap openings 1352). The upper and lower sides of the opening of the longitudinal snap holes 132 are respectively formed with a positioning groove 136.

The connector 20 is provided with a connector body part 21 and a connection end 22, with a duct hole 23 formed through them. Near the connection end 22, the left and right sides of the connector body part 21 are respectively formed with a positioning snap groove 24 (also identified as a first snap groove 241 and a second snap groove 242). Near the connection end 22, the upper and lower side of the connector body part 21 are respectively formed with a positioning bump 25. The fitting hole 130 formed in the fitting part 13 of the fitting connector 10 fits to the connection end 22. The snap openings 134 on both sides of the hole inner wall 131 of the fitting hole 130 are opposite to the positioning snap grooves 24 provided on both sides of the connection end 22. The two positioning grooves 136 of the longitudinal snap holes 132 provided in the fitting hole 130 of the fitting part 13 are positioned by the two positioning bumps 25 formed on the connector body part 21.

The U-shaped positioning snap pin 30 has a pin base 31, both sides of which are extended downward by two pin body parts 32 (also identified as the first pin body part 321 and the second pin body part 322) in an elastic way. The outer sides of the two pin body parts 32 are respectively protruded with a snap protrusion 320. Between the two pin body parts 32 is provided with a positioning inner recess 33. The two pin body parts 32 achieve positioning along a positioning line 34, respectively. The two pin body parts 32 follow the positioning lines 34 to snap the longitudinal snap holes 132 provided on both sides of the fitting part 13, simultaneously snapping the positioning snap grooves 24 formed on both sides of the connection end 22. The snap protrusions 320 formed on the outer sides of the two pin body parts 32 engage against the side snap openings 135 on the hole inner wall 131 on both sides of the longitudinal snap holes 132. The positioning inner recess 33 formed between the two pin body parts 32 snap the resisting block 133 formed on the fitting part 13.

The above description details the disclosed quick connector structure.

Please refer to FIGS. 2 to 5, which show respectively a three-dimensional exploded view of the disclosed quick connector structure, the disclosed quick connector structure being used to connect two pipes, a first embodiment of the disclosed quick connector structure used at a three-way valve connector, and a second embodiment of the disclosed quick connector structure used at a washing machine valve connector. The fitting connector 10 is a pipe connector, a three-way valve connector, or a washing machine valve connector. The fitting hole 130 formed in the fitting part 13 of the fitting connector 10 is fitted to the connection end 22 of the connector 20. The two snap openings 134 formed on both sides of the hole inner wall 131 of the fitting hole 130 are opposite to the positioning snap grooves 24 formed on both sides of the connection end 22. The U-shaped positioning snap pin 30 has the ability to be inserted into the fitting part 13 in two different orientations into the fitting part 13 and the connector 20. Furthermore, as can be seen in the drawings, the U-shaped positioning snap pin 30 is symmetrical about a plane that extends through the middle of the pin base 31 and the two pin body parts 32, and thus is able to be inserted in the two different orientations. The first pin body part 321 can be inserted into the first longitudinal snap hole 1321 and the second pin body part 322 can be inserted to the second longitudinal snap hole 1322, or vice versa, to secure the fitting part 13 to the fitting connector. The two pin body parts 32 formed on the U-shaped positioning snap pin 30 go through the longitudinal snap holes 132 on both sides of the fitting part 13, simultaneously snapping the positioning snap grooves 24 on both sides of the connection end 22. The snap protrusions 320 formed on the outer sides of the two pin body parts 32 engage against the side snap openings 135 on both sides of the longitudinal snap holes 132 on the hole inner wall 131. The positioning inner recess 33 formed between the two pin body parts 32 snaps the resisting block 133 formed on the fitting part 13. The connector part 11 of the fitting connector 10 is combined with the pipe body 40. The U-shaped positioning snap pin 30 ensures the stability of the connection between the fitting connector 10 and the connector 20. As mentioned above, The U-shaped positioning snap pin 30 has the ability to be inserted into the fitting part 13 in two different orientations, rotated 180 degrees, into the fitting part 13 and connector 20. This enables a quick positioning assembly and reduces the difficulty in assembly in a smaller or concealed space, achieving the effects of stability and convenience in assembly.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. An apparatus comprising:
    a fitting connector comprising:
        a connector part;
        a fitting connector body part coupled to the connector part; and
        a fitting part coupled to the fitting connector;
        wherein the connector part, the fitting connector body part, and the fitting part define a fitting hole extending therethrough; and the fitting part defines positioning groove, a longitudinal snap hole, and a side snap opening in communication with the longitudinal snap hole;
    a connector comprising:
        a connection end;
        a connector body part coupled to the connection end;
        a positioning bump;
        wherein the connection end and the connector body part define a duct hole extending therethrough; the connection end defines a positioning snap groove; the fitting connector is configured to accept the connection end in the fitting hole; when the connection end is fully inserted into the fitting connector:
            the positioning bump is located in the positioning groove;
            the longitudinal snap hole is aligned with the positioning snap groove;
    a valve, and the valve is coupled to the connector;
    a U-shaped positioning snap pin comprising:
        a pin base;
        a pin body part coupled to the pin base;
        a snap protrusion coupled to the pin body part;
        wherein the U-shaped positioning snap pin is configured to be partially inserted and fully inserted into the longitudinal snap hole; when partially inserted, the snap protrusion engages the side snap opening and the connector is able to be inserted into the fitting connector;
    and when fully inserted and when the connector is inserted into the fitting connector, the pin body part engages the positioning snap groove and the snap protrusion engages a longitudinal snap hole exit.

2. The apparatus of claim 1, further comprising a pipe body coupled to the connector part.

3. The apparatus of claim 1, wherein the valve and the connector are integral.

4. The apparatus of claim 1, wherein the U-shaped positioning snap pin can be partially inserted and fully inserted in a first orientation and a second orientation.

5. The apparatus of claim 1, wherein the U-shaped positioning snap pin is symmetrical about a first plane that is perpendicular to and extends through a middle of the pin base.

6. The apparatus of claim 1, wherein the longitudinal snap hole comprises the longitudinal snap hole exit and a longitudinal snap hole top, and the longitudinal snap hole top and the longitudinal snap hole exit are encircled by the fitting part.

7. The apparatus of claim 1, wherein the fitting part further comprises a resisting block and the U-shaped positioning snap pin defines a positioning inner recess; and when fully inserted, the resisting block is located inside the positioning inner recess.

8. An apparatus comprising:
 a fitting connector comprising:
  a connector part;
  a fitting connector body part coupled to the connector part; and
  a fitting part coupled to the fitting connector;
  wherein the connector part, the fitting connector body part, and the fitting part define a fitting hole extending therethrough; and the fitting part defines a positioning groove, longitudinal snap holes, and each longitudinal snap hole has a side snap opening in communication therewith;
 a connector comprising:
  a connection end;
  a connector body part coupled to the connection end;
  a positioning bump;
  wherein the connection end and the connector body part define a duct hole extending therethrough; the connection end defines two positioning snap grooves; the fitting connector is configured to accept the connection end in the fitting hole; when the connection end is fully inserted into the fitting connector;
   the positioning bump is located in the positioning groove;
   the longitudinal snap hole is aligned with positioning snap groove;
 a U-shaped positioning snap pin comprising:
  a pin base, wherein the pin base defines a plane;
  two pin body parts coupled to and extending from the pin base;
  a snap protrusion extending along the plane from each pin body part;
  wherein each pin body part is configured to be partially inserted and fully inserted into the longitudinal snap holes; when partially inserted, each snap protrusion engages one of the side snap openings and the connector is able to be inserted into the fitting connector; and when fully inserted and when the connector is inserted into the fitting connector, the each pin body part engages one of the two positioning snap grooves and each snap protrusion engages a longitudinal snap hole exit.

9. The apparatus of claim 8, further comprising a pipe body coupled to the connector part.

10. The apparatus of claim 8, further comprising a valve, and the valve is coupled to the connector part.

11. The apparatus of claim 10, wherein the valve and the connector are integral.

12. The apparatus of claim 8, wherein the U-shaped positioning snap pin can be partially inserted and fully inserted in a first orientation and a second orientation.

13. The apparatus of claim 8, wherein the U-shaped positioning snap pin is symmetrical about a first plane that is perpendicular to and extends though a middle of the pin base.

14. The apparatus of claim 8, wherein the longitudinal snap holes are encircled by the fitting part.

15. The apparatus of claim 8, wherein the fitting part further comprises a resisting block and the U-shaped positioning snap pin defines a positioning inner recess; and when fully inserted, the resisting block is located inside the positioning inner recess.

16. The apparatus of claim 8, wherein each pin body part can be inserted into each longitudinal snap hole.

17. An apparatus comprising:
 a fitting connector comprising:
  a connector part;
  a fitting connector body part coupled to the connector part; and
  a fitting part coupled to the fitting connector;
  wherein the connector part, the fitting connector body part, and the fitting part define a fitting hole extending therethrough; and the fitting part defines positioning groove, a longitudinal snap hole, and a side snap opening in communication with the longitudinal snap hole; the longitudinal snap hole comprises a longitudinal snap hole exit and a longitudinal snap hole top, and the longitudinal snap hole top and the longitudinal snap hole exit are encircled by the fitting part;
 a connector comprising:
  a connection end;
  a connector body part coupled to the connection end;
  a positioning bump;
  wherein the connection end and the connector body part define a duct hole extending therethrough; the connection end defines a positioning snap groove; the fitting connector is configured to accept the connection end in the fitting hole; when the connection end is fully inserted into the fitting connector:
   the positioning bump is located in the positioning groove;
   the longitudinal snap hole is aligned with the positioning snap groove;
 a U-shaped positioning snap pin comprising:
  a pin base;
  a pin body part coupled to the pin base;
  a snap protrusion coupled to the pin body part;
  wherein the U-shaped positioning snap pin is configured to be partially inserted and fully inserted into the longitudinal snap hole; when partially inserted, the snap protrusion engages the side snap opening and the connector is able to be inserted into the fitting connector; and when fully inserted and when the connector is inserted into the fitting connector, the pin body part engages the positioning snap groove and the snap protrusion.

* * * * *